Feb. 2, 1926. 1,571,272
B. W. KADEL
JOURNAL BOX
Filed Nov. 5, 1923
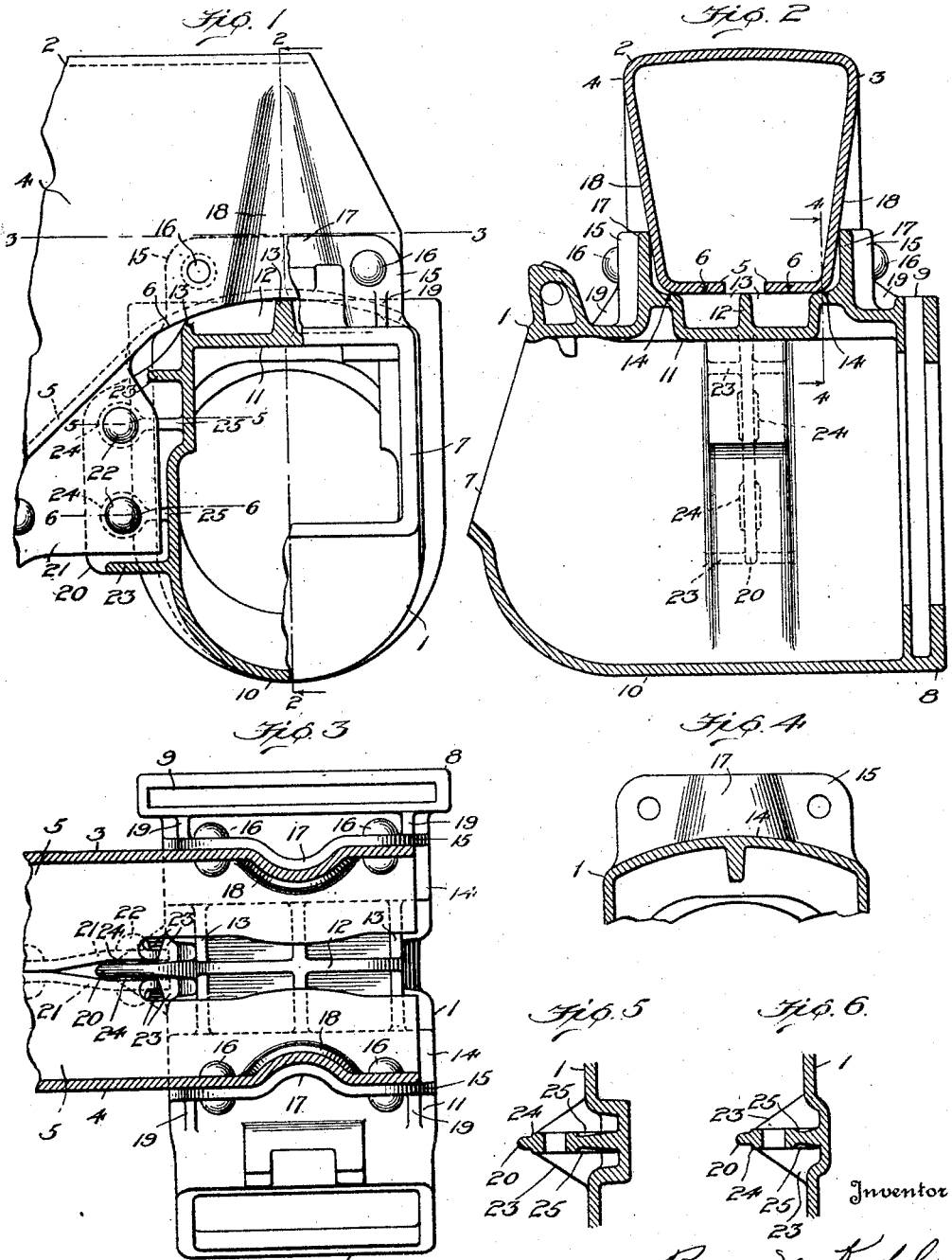

Patented Feb. 2, 1926.

1,571,272

UNITED STATES PATENT OFFICE.

BYERS W. KADEL, OF BALTIMORE, MARYLAND, ASSIGNOR, BY MESNE ASSIGNMENTS, TO THE SYMINGTON COMPANY, A CORPORATION OF MARYLAND.

JOURNAL BOX.

Application filed November 5, 1923. Serial No. 672,864.

*To all whom it may concern:*

Be it known that I, BYERS W. KADEL, a citizen of the United States, residing at Baltimore, in the State of Maryland, have invented certain new and useful Improvements in Journal Boxes; and I do hereby declare the following to be a full, clear, and exact description of the invention, such as will enable others skilled in the art to which it appertains to make and use the same.

My invention relates to journal boxes and involves the production of a very strong but comparatively light weight construction designed primarily for use in connection with car truck side frames of the wrought metal type in which the inner and outer walls and adjacent stiffening flanges are shaped to form journal box recesses at the ends of the side frame.

One of the principal features of the invention is to provide a journal box having means adapted to provide a very rigid and durable connection with a car truck side frame, said means involving the arrangement of a plurality of advantageously located projecting portions adapted to be firmly united to adjacent portions of the side frame so as to produce a construction in which the relative rotating and lateral strains imparted to the box as the result of service conditions, will be effectively resisted.

Another object of the invention is to provide a journal box of maximum strength value, the top of said box being crowned to fit within a correspondingly curved journal box recess of the side frame, said top being preferably of ribbed construction and having at least one of said ribs continued downwardly along one side of the journal box to form an attaching member to which the side frame is firmly connected whereby the journal box is prevented from relative rotation with respect to the side frame by loads occurring in either direction longitudinally thereof.

A further object of the invention is to provide a journal box for use with a car truck side frame having inner and outer walls arranged in spaced relation, each of said walls having corresponding side frame portions forming the top arch bar, bottom arch bar, and truck columns, said box having upwardly extending attaching portions adapted to embrace neighboring portions of said inner and outer walls, respectively, said attaching portions being rigidly connected and interlocked with the walls against relative movement longitudinally of the side frame, said interlocking connection providing a very rigid construction of both journal box attaching portions and the adjacent side frame portions, whereby the loads occurring laterally of the car truck are resisted without deformation or breakage of the connected parts.

With these and other objects in view, the invention further consists in the combination, arrangement and construction of the several parts hereinafter described and pointed out in the claims.

In the drawings illustrating the invention and wherein similar reference characters designate corresponding parts in the several views:

Figure 1 is a fragmentary view in sectional side elevation of a portion of a car truck side frame and journal box constructed in accordance with the invention.

Figure 2 is a vertical transverse sectional view on the line 2—2 of Figure 1.

Figure 3 is a horizontal sectional view on the line 3—3 of Figure 1.

Figure 4 is a detail longitudinal vertical sectional view of the journal box on the line 4—4 of Figure 2.

Figure 5 is a detail horizontal sectional view on the line 5—5 of Figure 1.

Figure 6 is a similar view on the line 6—6 of Figure 1.

Referring to the drawings, my improved journal box 1 is shown attached to the car truck side frame 2 preferably formed of wrought metal and having an inner wall 3 and an outer wall 4. I have illustrated my invention as applied to a car truck side frame formed of a sheet-metal blank or blanks, but it will be understood that the present construction of journal box is applicable to other types of side frames. In the construction of side frame shown the walls thereof are formed with corresponding side frame portions preferably reinforced with marginal inturned stiffening flanges, said flanges being preferably united by riveting or welding. The stiffening flanges 5 of the bottom arch bar portions of the side frame are bent inwardly and downwardly, as shown, the inwardly bent portions of said flanges being continued at each end of the side frame and shaped to form the curved journal box recesses 6.

The journal box 1 includes the outer and inner end portions 7 and 8, the former being adapted to receive the usual lid (not shown) and the latter having provided therein the dust-guard well 9. The bottom of the journal box is indicated by the numeral 10 and the top or roof by the numeral 11, said top being preferably crowned to form a curved bearing surface contacting a similarly curved surface of the journal box recess. The upper face of the top 11 is provided with a longitudinally extending rib 12, said rib being intersected by a plurality of transversely disposed ribs 13, said last named ribs intersecting the principal bearing surfaces 14 of the journal box disposed upon each side of the longitudinally extending rib. The crowning of the upper face of the box provides a relatively stiff journal box roof, the shape of which lends itself to a more satisfactory bending of the stiffening flanges forming the journal box recesses in the manufacture of the side frame. The relative increased depth of the top of the journal box intermediate the side edge portions provides a crowned structure which permits of the journal box being firmly seated in the recess of the side frame. The upper surface of the principal bearing portions of the journal box roof and the top edges of the intersecting ribs are curved longitudinally of the side frame, said curving acting to provide an effective seating surface with minimum strains upon the adjacent metal of the side frame, and also permit of the use of a comparatively small blank or blanks from which the side frame is formed.

The attaching portions or lugs 15 of the journal box project upwardly from the top thereof and are connected to the inner and outer walls of the side frame, respectively, by means of rivets 16 passing through suitable openings in the lugs. Intermediate portions 17 of the attaching lugs extend inwardly of the side frame, said portions providing interlocking means with corresponding inwardly extending portions 18 provided on the inner and outer walls of the side frame. This interlocking connection is disposed longitudinally of the journal box axis and transversely to the direction of the loads received by the journal box longitudinally of the side frame. The inwardly extending co-acting portions 17 and 18 of the journal box and side frame, respectively, are in the nature of corrugations, the corrugations of the side frame walls adding to the relative rigidity of the side frame at the end portions overlying the journal boxes and the corrugating of the journal box attaching lugs serving to materially stiffen the box and also permitting the coring out of the full area brass lug on the interior of the box. The attaching lugs 15 border the main bearing surfaces 14 from which they project outwardly at right angles thereto, reinforcing webs 19 being provided to brace the attaching lugs, as shown. The corrugated portions 18 of the side frame walls are of cone-like formation, the opposed inner faces of the attaching lugs 17 at their upper edges firmly contacting the adjacent corrugated portions of the respective inner and outer walls, as best shown in Figure 1.

The longitudinally extending rib 12 at the top of the journal box is continued downwardly along one side thereof to form another attaching lug 20 disposed centrally of the side frame, said lug, in addition to providing a very rigid connection at one side of the box, also serving as an abutment member for resisting the relative rotative forces transmitted to the journal box. The attaching lug 20 is connected to adjacent depending portions 21 extending from the inturned stiffening flanges 5 bordering the lower edges of the walls of the side frame. A plurality of rivets 22 rigidly connect the lug 20 to the neighboring portion of the side frame, said rivets passing through suitable openings in the lug and being vertically arranged so as to tie the journal box to the side frame in the most advantageous manner.

The attaching lug 20 is preferably inserted between the depending portions 21 of the side frame stiffening flanges, the outer edges of which may be designed to contact adjacent portions of the journal box wall. Laterally extending bracing ribs 23 unite the attaching lug 20 with the side walls of the box from which the lug projects. Bosses 24 preferably surround the rivet openings in the lug, the relative increased thickness of the metal incident to the forming of said bosses being continued in the nature of ribs 25 to the journal box side wall.

In my present construction of journal box the brass and wedge are fitted about the car axle within the journal box, all in the usual manner, the standard A. R. A. dimensions being maintained. A journal box constructed in accordance with my present invention is capable of being economically manufactured and easily connected to a car truck side frame, the means employed to connect the side frame and journal box acting to resist the strains tending to rotate the box with respect to the side frame. It will also be observed that the interlocking association of portions of the journal box with adjacent portions of the side frame forms a very intimate and rigid construction of side frame and journal box capable of resisting both longitudinal and lateral loads occurring as the result of service conditions.

I claim:

1. A journal box for railway cars, having a crowned top portion adapted to conform to the correspondingly curved portion of a car truck side frame, said top portion including a plurality of intersecting ribs, the upper faces of which are adapted to contact the adjacent curved portion of the side frame.

2. A journal box for railway cars comprising side walls, a wall uniting the side walls at the bottom of said box, and a roof portion connecting the side walls at the top of the box, said roof portion having a crowned exterior forming a bearing surface adapted to engage a car truck side frame, and means including a lug located adjacent said crowned exterior for attaching the journal box to the side frame.

3. A journal box for railway cars having a top wall, the upper surface of which is curved longitudinally of the car truck side frame to which the box is connected, said wall being of a relatively increased depth intermediate the opposite sides of the journal box and including a reinforcing rib disposed longitudinally of the side frame.

4. A journal box for railway cars having a top wall, the exterior of which is composed of a plurality of intersecting ribs, said ribs having their upper edges curved to form a crowned bearing surface extending transversely of the journal box and longitudinally of the side frame to which the journal box is connected.

5. A journal box for railway cars having a crowned exterior portion adapted to engage a car truck side frame, and means including an upstanding lug projecting from said box for connecting the same to the side frame, said lug having a portion projecting inwardly of the crowned exterior for engagement with an adjacent portion of the side frame.

6. A journal box for railway cars having a crowned exterior portion adapted to engage a correspondingly curved portion of a car truck side frame, a plurality of attaching portions projecting from the journal box adjacent said crowned exterior, each of said attaching portions being provided with openings, and means extending from said attaching portions between the openings therein for engaging a portion of the car truck side frame.

7. A journal box for railway cars having a plurality of side frame attaching portions, each of said portions being provided with a rivet opening, and means extending from each attaching portion adjacent the rivet opening adapted to interlock the journal box with an adjacent portion of a car truck side frame.

8. A journal box for railway cars comprising a top portion adapted to engage a car truck side frame, lugs projecting from said top portion adapted to embrace neighboring portions of the side frame, each of said lugs having a portion projecting transversely of the side frame for interlocking engagement therewith.

9. A journal box for railway cars having projections adapted to embrace neighboring portions of a car truck side frame longitudinally thereof, each of said portions being provided with an extension disposed transversely of the side frame and adapted to engage an adjacent portion thereof with which it is interlocked and connected.

10. A journal box for railway cars having projections adapted to embrace neighboring portions of a car truck side frame longitudinally thereof, each of said projections intermediate its ends being shaped to provide a transverse extension adapted to engage the side frame, said transverse extension serving to reinforce the projections embracing the side frame and provide an interlocking connection between the side frame and journal box.

11. A joural box for railway cars having a top wall adapted to engage a car truck side frame, lugs extending from said wall arranged to embrace neighboring portions of the side frame, and another lug projecting from the journal box, said last named lug being provided with an opening designed to receive a fastening device for connecting the journal box to the side frame.

12. A journal box for railway cars comprising side walls, a bottom wall, and a top wall, said top wall being adapted to engage a car truck side frame, lugs extending from said top wall arranged to embrace neighboring portions of the side frame, and a lug extending from one of said side walls below the aforesaid lugs, said last named lug being provided with a plurality of vertically disposed openings adapted to receive fastening devices connecting the last named lug to the side frame at a plurality of points.

13. A journal box for railway cars having a top wall formed with a plurality of ribs, the upper faces of which are adapted to contact a car truck side frame, and an attaching lug extending from the journal box along one side wall thereof, said lug forming a continuation of at least one of the ribs at the top of the box and being adapted to receive means connecting said lug to the side frame.

14. A journal box for railway cars comprising a top wall adapted to contact a car truck side frame, said wall including a longitudinally disposed rib, means including a lug extending from at least one side wall of the journal box for attaching the same to the side frame, said lug being arranged in alinement with the longitudinally disposed rib, and said lug being adapted to receive means for rigidly connecting it to the side frame.

15. A journal box for railway cars comprising a top wall adapted to engage a car truck side frame, means including upstanding projections designed to embrace neighboring portions of the side frame, each of said projections having an opening and a reinforcing portion adjacent said opening, and a vertically disposed lug projecting from the journal box below said upstanding projections, said lug being provided with a plurality of openings, and means reinforcing said lug.

16. A journal box for railway cars comprising a top wall adapted to engage a car truck side frame, means including upstanding projections designed to embrace neighboring portions of the side frame, and adapted to be connected therewith, means reinforcing said projections, a lug extending from the journal box at a point below said upstanding projections and intermediate thereof, said lug being adapted to be connected to the side frame, and means reinforcing said lug.

17. In combination, a car truck side frame involving inner and outer walls, each of said walls being provided with stiffening flanges bent to form journal box recesses, and each of said flanges having a depending portion, journal boxes each having a crowned portion adapted to engage an adjacent journal box recess, lugs formed on said journal box adapted to embrace the walls of the side frame, means connecting said lugs to the walls, another lug provided on the journal box, and means connecting said last named lug to the depending portions of said stiffening flanges.

18. In combination, a car truck side frame, involving inner and outer walls, said walls being provided with stiffening flanges shaped to provide journal box recesses at the respective ends of the side frame and having corrugated portions adjacent said recesses, journal boxes each having a portion adapted to engage the adjacent journal box recess, projections provided on said journal boxes each having a portion adapted to fit within the corrugated portion of the adjacent wall, means connecting said projections to the respective walls upon each side of the respective corrugations, a lug extending from each journal box below saw projections, and means connecting said lug to the stiffening flanges at a plurality of points.

19. In combination, a car truck side frame having a journal box recess, a journal box having a portion adapted to fit within said recess, means provided on said journal box adapted to embrace the side frame, said means acting to interlock the journal box and side frame in longitudinal and transverse directions, and means rigidly connecting the journal box to the side frame.

20. In combination, a car truck side frame having a journal box recess, a journal box having a portion adapted to fit within said recess, means provided on said box adapted to embrace the side frame, said means acting to interlock the journal box and side frame in both longitudinal and transverse directions, a projection extending from the journal box, and means rigidly connecting said projection to the side frame to form a tight connection in conjunction with the aforesaid interlocked portions for resisting relative rotative forces imparted to the journal box.

In testimony whereof I affix my signature.

BYERS W. KADEL.